P. W. MACKENZIE.
APPARATUS FOR THE MANUFACTURE OF ILLUMINATING-GAS.

No. 191,808. Patented June 12, 1877.

UNITED STATES PATENT OFFICE.

PHILIP W. MACKENZIE, OF BLAUVELTVILLE, NEW YORK.

IMPROVEMENT IN APPARATUS FOR THE MANUFACTURE OF ILLUMINATING-GAS.

Specification forming part of Letters Patent No. 191,808, dated June 12, 1877; application filed August 16, 1876.

*To all whom it may concern:*

Be it known that I, PHILIP W. MACKENZIE, of Blauveltville, in the county of Rockland and State of New York, have invented a new and useful Improvement in Apparatus for the Manufacture of Illuminating-Gas; and I do hereby declare that the following is a full, clear, and exact description of the same, reference being had to the accompanying drawing, which forms part of this specification.

This invention relates to gas-producing furnaces or apparatus for the production of carbureted hydrogen or illuminating-gas from gas-coals or other analogous substances rich in carbon, a part of the coke in the furnace—supposing coal to be the material used—being consumed or decomposed, and producing a hydrogen and carbonic-oxide diluent for the rich gas produced by the use of cannel or hydrocarbons.

The invention consists in a combination, with the combustion-chamber of a gas-producing furnace, and one or more inlets or tuyeres for superheated steam in communication with said chamber from beneath, of a dome or equivalently-shaped chamber mounted on the combustion chamber, and in free communication at its bottom therewith, but separately or additionally heated externally, said chamber acting as a receiver for the permanent gas produced by the burning up of the material in the combustion-chamber; also as a retort, for converting into permanent gas any mingled vapors not converted in the combustion-chamber of the furnace, thus producing a permanent illuminating-gas within the furnace itself, the dome or chamber on top of the combustion-chamber virtually forming a part of the furnace. The invention also consists in a certain combination, with the furnace, of a gas or draw-off pipe, arranged to dip down into the dome or cap-like externally-heated chamber which is mounted upon the combustion-chamber of the furnace, and one or more cone-distributers at the bottom of said pipe, whereby a more thorough exposure of the gases to the heated surfaces of the dome, before they escape from the furnace, is effected, and a more perfect distribution of the material to be converted into gas may be obtained.

Figure 1:
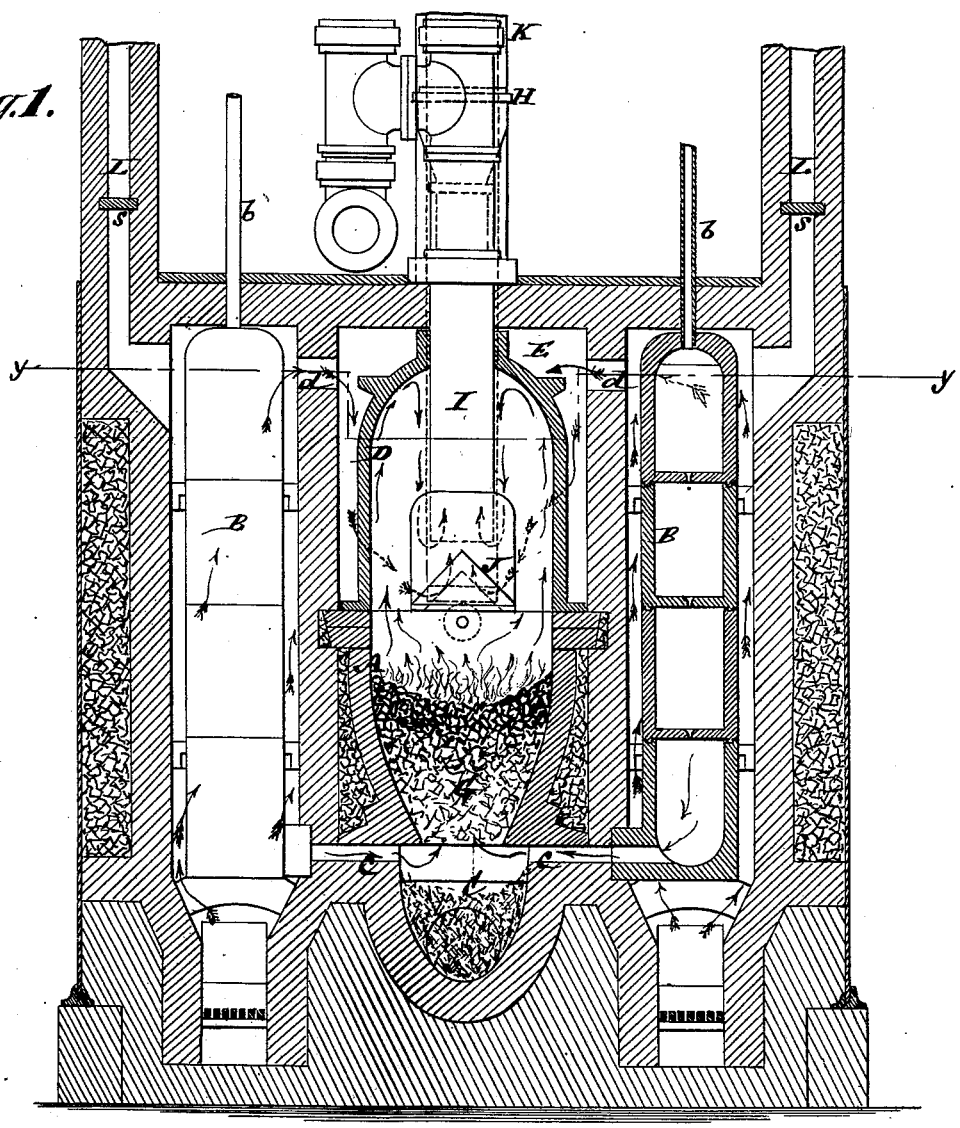
Figure 2:
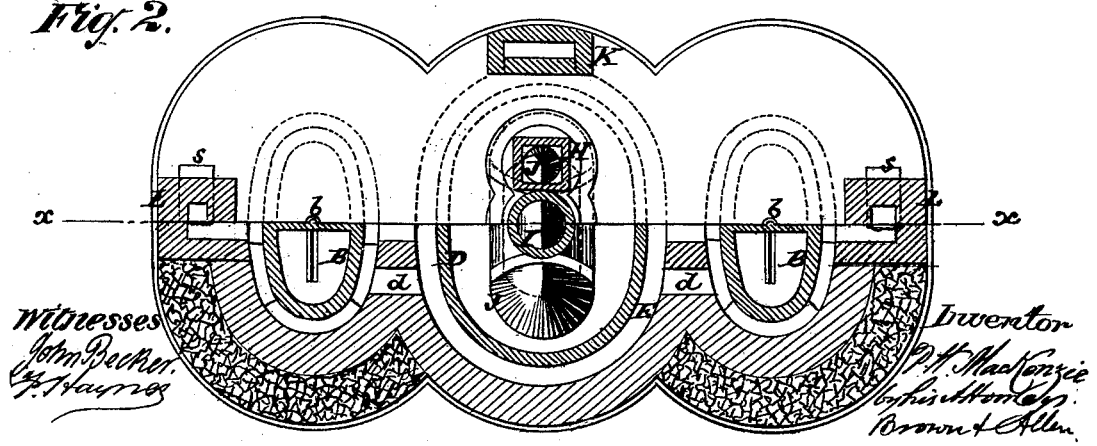

In the accompanying drawing, Figure 1 represents a vertical section, on the line $x\,x$, of an apparatus for the manufacture of illuminating-gas, having my invention applied; and Fig. 2, a half-sectional plan thereof, the section being taken as indicated by the line $y\,y$.

A is the combustion-chamber proper of the gas-producing furnace, in which the material is burnt up into a permanent hydrogen and carbonic oxide, and to which superheated steam is admitted below while the generated gases pass off above. So far as this combustion-chamber A and the means for supplying it from below with highly superheated steam are concerned, the apparatus is substantially similar to that described in Letters Patent No. 168,265, issued to me September 28, 1875, in which are one or more sectionally-constructed steam-superheating retorts, B, each encompassed by a flue, and composed of compartments mounted one upon the other, and provided with contracted communicating apertures between said compartments; also with a steam-inlet, $b$, in communication with the upper one of said compartments, and a steam inlet or tuyere, $c$, below, connecting such retort with the decomposing-chamber of the apparatus; also, in which the decomposing-chamber is constructed with a free open bottom, and has a cinder or ash-pit, C, of greater area at its top than the base of the decomposing-chamber A, above it. Such retorts B have separate fires applied to them, and the waste heat from them may be utilized to externally heat the dome-shaped chamber or receiver D, mounted on the combustion-chamber A, by means of passages $d$, in communication with the combustion-space E surrounding the receiver D. Said chamber or receiver D, however, may be heated externally by a separate furnace.

The material G, to be burnt up into a permanent gas, is fed in from above by means of a hopper, H, or in any suitable way, and descends to the combustion-chamber A below, and is kept piled up within the latter to a height of two or three feet, more or less, above the steam tuyeres or apertures $c$.

In the operation of this furnace or apparatus, the hydrogen and carbonic oxides rising from the lower portion of the combustion-chamber A mingle with the hydrocarbon vapors in and immediately above the gas-producing material G, and circulate up against the heated sides of the retort or chamber D, and ultimately pass out through a central inverted pipe, I, dipping down within the retort or chamber D, and from thence to the hydraulic main.

Arranged below the pipe I are one or more distributing-cones, J, which serve to spread the coal or material being fed to the outside of the interior of the furnace, and, further, serve to prevent the immediate escape of the gas through the pipe I in advance of its passage over the heated interior surface of the retort dome or chamber D.

The inverted or dip pipe I may either be suspended from above or rest upon suitable settings.

K is a chimney for keeping up circulation through the chamber E, and L L are chimneys connected with the furnaces of the retorts B, and provided with dampers $s$, for more or less diverting the waste heat through the chamber E.

The dome or chamber D, it will be distinctly understood, is not charged with coal or other material to be burnt up into a permanent gas in the combustion-chamber, but, although virtually a part of the furnace, is simply an externally-heated close cap or cover over the combustion-chamber, and serves to catch any mingled vapors not converted in the combustion-chamber, and to convert them into such a gas before they escape from the furnace.

I claim—

1. The combination, with the combustion-chamber A and one or more inlets or tuyeres, $c$, for superheated steam below said chamber, of the externally-heated dome or chamber D, mounted on and in communication with the combustion-chamber, substantially as and for the purposes herein set forth.

2. The combination of the gas-escape dip-pipe I, and one or more distributing-cones, J, with the externally-heated dome or chamber D and the combustion-chamber A of the furnace, essentially as described.

P. W. MACKENZIE.

Witnesses:
HENRY T. BROWN,
BENJAMIN W. HOFFMAN.